(12) United States Patent
Bartek et al.

(10) Patent No.: US 10,894,551 B2
(45) Date of Patent: Jan. 19, 2021

(54) LATERAL RAIL MEASUREMENT DEVICE

(71) Applicant: Protran Technology, LLC, West Columbia, SC (US)

(72) Inventors: Peter M. Bartek, Ledgewood, NJ (US); Corey Dash, Mount Arlington, NJ (US)

(73) Assignee: PROTRAN TECHNOLOGY, LLC, West Columbia, SC (US)

( * ) Notice: Subject to any disclaimer, the term of this patent is extended or adjusted under 35 U.S.C. 154(b) by 0 days.

(21) Appl. No.: 16/457,432

(22) Filed: Jun. 28, 2019

(65) Prior Publication Data

US 2020/0070857 A1 Mar. 5, 2020

Related U.S. Application Data

(60) Provisional application No. 62/727,412, filed on Sep. 5, 2018.

(51) Int. Cl.
*B61L 23/04* (2006.01)
*G01B 5/14* (2006.01)
*B61L 25/02* (2006.01)

(52) U.S. Cl.
CPC .......... *B61L 23/047* (2013.01); *B61L 25/021* (2013.01); *G01B 5/14* (2013.01)

(58) Field of Classification Search
CPC ................................ G01B 5/14; B61L 23/047
USPC .......................................................... 33/338
See application file for complete search history.

(56) References Cited

U.S. PATENT DOCUMENTS

| 1,098,253 | A | * | 5/1914 | Gruetzman | 33/338 |
| 1,457,425 | A | * | 6/1923 | Busby | E01B 35/00 33/338 |
| 2,829,438 | A | | 4/1958 | Cutler | |
| 2,859,528 | A | | 11/1958 | Grossman | |

(Continued)

FOREIGN PATENT DOCUMENTS

| CN | 201059967 Y | 5/2008 |
| DE | 19801311 A1 | 5/1999 |

(Continued)

OTHER PUBLICATIONS

Website: Qijin Chen, et al., "A Railway Track Geometry Measuring Trolley System Based on Aided INS," <www.mdpi.com/journal/sensors>, 2018, MDPI, Basel, Switzerland.

(Continued)

*Primary Examiner* — Christopher W Fulton
(74) *Attorney, Agent, or Firm* — Norton Rose Fulbright US LLP (57) ABSTRACT

The invention relates to a portable device for measuring lateral rail measurements under service to record and report excessive rail movement and angle differential to prevent a train from derailing. The device may be spring-loaded and light-weight. The device may include a microprocessor, sensors, and a display. The device may be installed on the rail. The device may sense an approaching train, automatically turn on the device, detect the train speed, and measure the angle differential, the real-time displacement, and the maximum/minimum displacement between the two rails while the train is operating over the rail at all speeds. The device measures and records the separation and angle differential of the rail to ensure the rail does not exceed separation that could derail the train.

37 Claims, 3 Drawing Sheets

(56) References Cited

U.S. PATENT DOCUMENTS

| | | | |
|---|---|---|---|
| 3,816,927 A | 6/1974 | Theurer et al. | |
| 3,952,665 A * | 4/1976 | Stewart | E01B 33/02 104/8 |
| 3,990,154 A * | 11/1976 | Theurer | E01B 35/00 33/523.2 |
| 4,075,889 A | 2/1978 | Jones | |
| 5,025,566 A * | 6/1991 | Fiechter | E01B 35/02 33/338 |
| 5,036,594 A * | 8/1991 | Kesler | E01B 35/02 104/7.2 |
| 5,630,282 A * | 5/1997 | West | B23D 35/007 33/201 |
| 5,791,063 A * | 8/1998 | Kesler | E01B 35/00 33/1 Q |
| 6,668,239 B1 | 12/2003 | Gilbert et al. | |
| 6,845,953 B2 | 1/2005 | Kane et al. | |
| 7,624,952 B1 * | 12/2009 | Bartek | B61L 23/06 246/124 |
| 8,844,149 B2 | 9/2014 | Madderom et al. | |
| 9,476,802 B2 | 10/2016 | Sato | |
| 10,000,223 B2 | 6/2018 | Moeller | |
| 2007/0211145 A1 * | 9/2007 | Kilian | B61K 9/04 348/148 |
| 2012/0257195 A1 * | 10/2012 | Scherf | B61K 9/08 356/237.1 |
| 2014/0200830 A1 * | 7/2014 | Bhattacharjya | B61K 9/08 702/34 |
| 2017/0305442 A1 | 10/2017 | Viviani | |
| 2018/0371699 A1 * | 12/2018 | Baker | B61L 23/047 |

FOREIGN PATENT DOCUMENTS

| | | | |
|---|---|---|---|
| EP | 2022698 | | 2/2009 |
| EP | 2647543 A1 | | 10/2013 |
| FR | 3012478 | | 5/2015 |
| GB | 2403541 A | | 1/2005 |
| GB | 2524027 A | | 9/2015 |
| KR | 2017-0122947 | | 11/1917 |
| RU | 2248424 C2 | | 3/2005 |
| RU | 179328 U1 | | 5/2018 |
| WO | WO-2010042774 A2 * | 4/2010 | E01B 35/02 |

OTHER PUBLICATIONS

Website: Author Unknown, "Strain Gauge Displacement Sensor," <https://appmeas.co.uk/pdf/lvdt-displacement-sensors/AML-SGD.pdf>, Jul. 5, 2018, Applied Measurements Ltd., Aldermaston, Berkshire, UK.
Website: Author Unknown, Portable Track Loading Fixture, <http://www.rrtools.com/Gauges/Portable-track-loading-fixture.asp>, Jul. 30, 2018, Railroad Tools and Solutions (LLC), Cincinnati, OH.
International Search Report and Written Opinion dated May 6, 2020 in PCT/US2019/049503.
Written Opinion of the International Preliminary Examining Authority issued in corresponding International Application No. PCT/US2019/049503 dated Nov. 10, 2020.

* cited by examiner

LATERAL RAIL MEASUREMENT DEVICE

CROSS-REFERENCE TO RELATED APPLICATIONS

This application claims priority to U.S. Provisional Patent Application No. 62/727,412, filed Sep. 5, 2018, entitled Lateral Rail Measurement Device, which is incorporated herein by reference in its entirety and made a part hereof.

FIELD OF THE INVENTION

The present invention relates to railcars and, more particularly, to a lateral rail measuring device for the railway industry.

BACKGROUND

There is no portable device that allows measurement and recording of rail displacement or rail angle differential during full service of a train or locomotive. Currently, the only way to measure the rail displacement distance between the tracks is measured with a measuring device without the ability of the device to measure during any railway operations. Generally, the prior art rail displacement measurement is completed at the top of the running rails and does not allow any load to be placed in the area where measurements are being completed. The only other device that allows for this measurement is a track loading fixture. The measurement by the track loading fixture is also not able to be completed during railway service and must be completed by getting special permission which delays the railway service or when there is no service. A need exists for a device that can be easily mounted in between the web of the running rail and detects the approaching train or locomotive, detects the speed, detects the amount of the rail movement, and data logs the information.

SUMMARY

Aspects of the disclosure relate to a portable device for measuring lateral rail measurements under service to record and report excessive rail movement to prevent a train from derailing. The device may include a microprocessor, sensors, and a display. The device may be installed on the rail. The device may sense an approaching train, automatically turn on the device, detect the train speed, and measure the real-time displacement and the maximum/minimum displacement between the two rails while the train is operating over the rail at all speeds.

According to an embodiment, a lateral measurement device to measure a distance between two rails when a train is passing over the device may include a control box configured to mount to a first rail and a measurement arm that extends from the control box to a second rail opposite the first rail. The measurement arm may measure a real-time rail displacement between the first rail and the second rail, a maximum displacement between the first rail and the second rail, and a minimum displacement between the first rail and the second rail while a train is operating over the first rail and the second rail at all speeds. The measurement arm may be spring-loaded within the control box and may extend to the second rail with the spring-loaded measurement arm. Additionally, the control box may include one or more sensors that automatically detect an approaching train and automatically turn on the lateral rail measurement device when an approaching train is in range. The control box may measure and record a separation distance and angle changes between the first rail and the second rail to ensure the separation distance and the angle differential does not exceed a distance that could derail the train. Further, the control box may include a display that displays one or more of the following: train speed, train direction, real-time rail displacement, and maximum and minimum displacement between the first rail and the second rail. The display may be customizable by programming to display other features and information. The display may be an LCD display. Additionally, the control box may include a microprocessor that includes data storage that can be programmed to record and log any data from the lateral rail measurement device. The data from the lateral rail measurement device may be transmitted from the control box to a communications satellite and/or cellular system to one or more remote receiving stations. The control box and the measurement arm may include a pivoting mount, wherein the pivoting mount of the control box attaches to a web of the first rail and the pivoting mount of the measurement arm attaches to a web of the second rail. The control box may include magnets to magnetically attach the control box to the first rail. The lateral rail measurement device may weigh less than 10 pounds.

According to another embodiment, a lateral rail measurement device to measure a distance between two rails when a train is passing over the device may comprise a control box configured to mount to a first rail and a measurement arm that extends from the control box to a second rail opposite the first rail. The control box may include a microprocessor that includes data storage that can be programmed to record and log any data from the lateral rail measurement device Further, the control box may include a display that displays one or more of the following data: a train speed, a train direction, a real-time rail displacement between the first rail and a second rail opposite the first rail, and maximum and minimum displacement between the first rail and the second rail. The measurement arm may measure the real-time rail displacement between the first rail and the second rail, the maximum displacement between the first rail and the second rail, and the minimum displacement between the first rail and the second rail while a train is operating over the first rail and the second rail at all speeds. Further, the measurement arm may be spring-loaded within the control box and may extend to the second rail with the spring-loaded measurement arm.

According to another embodiment, a lateral rail measurement device to measure a distance between two rails when a train is passing over the device may comprise a control box configured to mount to a first rail and includes a pivoting mount that attaches to a web of the first rail and a measurement arm that extends from the control box to a second rail opposite the first rail. The control box may comprise: a microprocessor that includes data storage that can be programmed to record and log any data from the lateral rail measurement device, an LCD display that displays the following data: a train speed, a train direction, a real-time rail displacement between the first rail and a second rail opposite the first rail, and a maximum and a minimum displacement between the first rail and the second rail, and one or more sensors that automatically detect an approaching train and automatically turn on the lateral rail measurement device when an approaching train is in range. The measurement arm may measure the real-time rail displacement between the first rail and the second rail, the maximum displacement between the first rail and the second rail, and the minimum displacement between the first rail and the second rail while a train is operating over the first rail and the second rail at all speeds. Further, the measurement arm may be spring-loaded within the control box and extends to the second rail with the spring-loaded measurement arm. The measurement arm may further include a pivoting mount that attaches to a web of the second rail.

According to yet another embodiment, a lateral rail measurement device to measure a distance between two rails when a train is passing over the device may comprise a control box configured to mount to a first rail and a measurement arm that extends from the control box to a second rail opposite the first rail. The control box may include magnets to magnetically attach the control box to the first rail. Further, the control box may comprise: a microprocessor that includes data storage that can be programmed to record and log any data from the lateral rail measurement device, and a display that displays one or more of the following data: a train speed, a train direction, a real-time rail displacement between the first rail and a second rail opposite the first rail, and a maximum displacement and a minimum displacement between the first rail and the second rail. The measurement arm may measure the real-time rail displacement between the first rail and the second rail, the maximum displacement between the first rail and the second rail, and the minimum displacement between the first rail and the second rail while a train is operating over the first rail and the second rail at all speeds. The measurement arm may be spring-loaded within the control box and may extend to the second rail with the spring-loaded measurement arm. The measurement arm may further include a pivoting mount that attaches to a web of the second rail.

These features, along with many others, are discussed in greater detail below.

BRIEF DESCRIPTION OF THE DRAWINGS

The reader is advised that the attached drawings are not necessarily drawn to scale.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

This invention is a lateral rail measurement device 100 for the railway industry designed to be light weight and portable. The lateral rail measurement device 100 may be spring-loaded and installed between the web of the rail. The lateral rail measurement device 100 may display the critical distance between two running rails under full rail service in the railway industry for the purpose of recording and reporting excessive rail movement to prevent a train from derailing. The lateral rail measurement device 100 may also determine and display an angle differential between the two running rails under full service. The lateral rail measurement device 100 may also allow for measurement of distance between two rails. The lateral rail measurement device 100 may be spring loaded. The lateral rail measurement device 100 may include a full display. The lateral rail measurement device 100 may automatically detect an approaching train. The lateral rail measurement device 100 may turn on automatically when an approaching train is in range. The lateral rail measurement device 100 may be light-weight and weigh under 10 pounds. The lateral rail measurement device 100 may be a portable device. The lateral rail measurement device 100 may include a microprocessor with multi-display.

Further, the invention may include a portable lateral rail measurement device 100 to measure lateral rail measurement under service to record and report excessive rail movement to prevent a train from derailing for the railway industry. The lateral rail measurement device 100 may be spring-loaded and light-weight. The lateral rail measurement device 100 may include a microprocessor, sensors, and display. Once the lateral rail measurement device 100 is installed on the web of the rail, the lateral rail measurement device 100 may sense an approaching train, automatically turn on, detect the train speed, measure the angle differential, real-time displacement, and maximum and minimum displacement between the two rails while a train is operating over the rail at all speeds. The lateral rail measurement device 100 may measure and record the separation and angle differential of the rail to ensure the lateral rail measurement device 100 does not exceed a separation distance that could derail the train.

Figure 1:
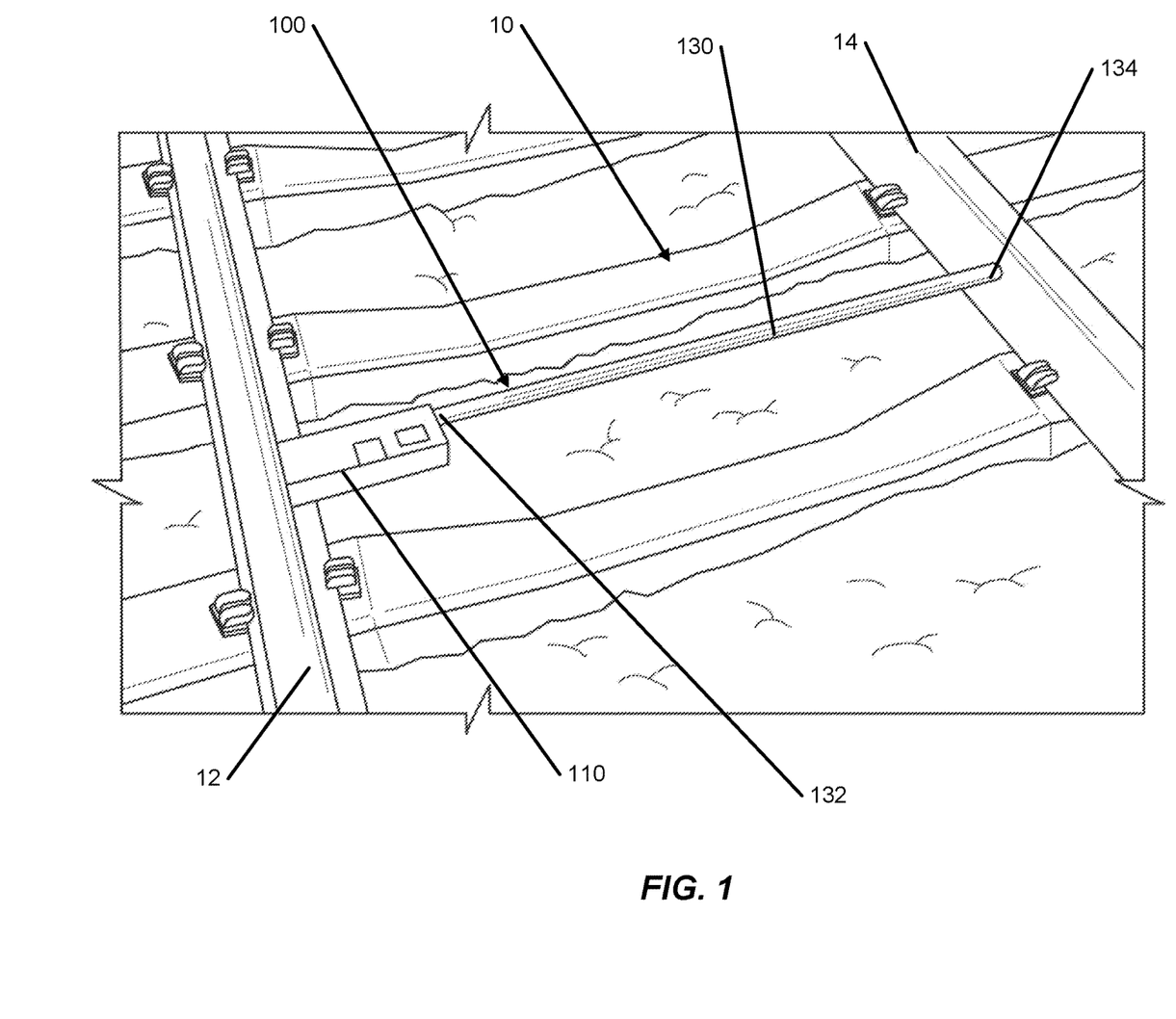
FIG. 1 is an overhead perspective view of a lateral rail measurement device within a railyard in accordance with an embodiment of the device of the present invention.
Figure 2:
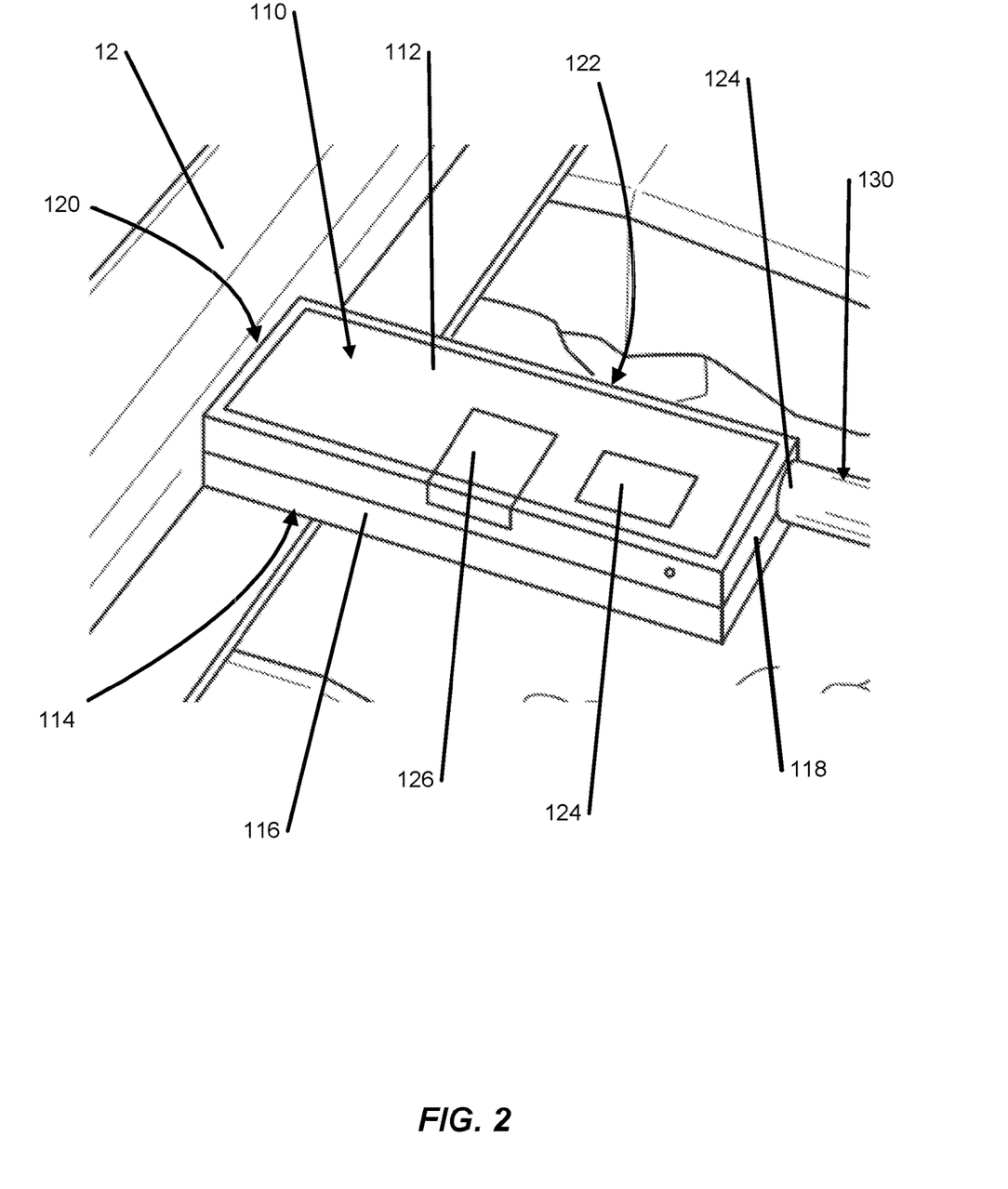
FIG. 2 is a close-up perspective view of the control box of the lateral rail measurement device illustrated in FIG. 1 in accordance with an embodiment of the device of the present invention.

FIGS. 1 and 2 illustrate a lateral rail measurement device 100. Specifically, FIG. 1 illustrates an overhead perspective view of a lateral rail measurement device 100 within a railway 10 at a railyard and FIG. 2 illustrates a close-up perspective view of the control box of the lateral rail measurement device 100 illustrated in FIG. 1. The lateral rail measurement device 100 may include a control box 110 and a measurement arm 130. The measurement arm 130 may extend from the control box 110 laterally. The measurement arm 130 may be spring-loaded from the control box 110 in order to extend to the rails and measure the displacement and angle differential between a first rail 12 and an opposite second rail 14 on a railway 10. Specifically as illustrated in FIG. 1, the control box 110 may be placed next to the first rail 12 and the measurement arm 130 may extend to the second rail 14.

As illustrated in FIG. 1, the measurement arm 130 includes a first end 132 and a second end 134 opposite the first end 132. The first end 132 may be attached or connected to the control box 110. The second end 134 may be spring-loaded and extend from the control box 110 and connect to the second rail 14 to measure the distance between the first rail 12 and the second rail 14.

As illustrated in FIG. 2, the control box 110 may be a rectangular shape with a top panel 112 and a bottom panel 114 opposite the top panel 112. The top panel 112 and bottom panel 114 may be connected by four side panels 116, 118, 120, 122. As illustrated in FIG. 2, the top panel 112 may include a display 124. The display 124 may be an LCD display or similar display known and used in the art. The display 124 may display various measurements, such as a real-time displacement between the first rail 12 and second rail 14, minimum and maximum displacements between the first rail 12 and the second rail 14, and speed and direction of the train over the rails 12, 14. The display 124 may be customizable by software and/or programming to display other features and other information as recognized as pertinent to the operators. The control box 110 may also include one or more sensors 126. The one or more sensors 126 may sense and detect an approaching train, automatically turn on the lateral rail measurement device 100, and measure and record a speed of the train travelling on the rails and over the lateral rail measurement device 100 and the control box 110.

Generally, the lateral rail measurement device 100 and specifically, the control box 110 may attach or be mountable to one of the rails 12, 14. The control box 110 and the measurement arm 130 may include pivoting mounts on both ends of the control box 110 and the measurement arm 130, wherein the pivoting mounts attach to the web of the rails 12, 14. In another embodiment, the portable object detector device 110 may attach or be mountable to one of the rails 12, 14 in various other mechanical means. For example, the control box 110 may attach or mount to the rails 12, 14 via the spring-loaded system of the control box 110 and the measurement arm 130. In another example embodiment, the control box 110 may include various magnets or magnetic arrays to magnetically attach the control box 110 to the rails 12, 14. Additionally, the control box 110 may utilize other mechanical coupling means, such as straps, snaps, clips, screw fasteners, and any other mechanical coupling means without departing from this invention.

The lateral rail measurement device 100 and specifically, the control box 110 may include a remote communication methods, such as a radar, a 900 MHz radio, and a microprocessor. The radio may be 900 MHz or other frequencies without departing from this invention. The radio may include an antenna on lateral rail measurement device 100 to transmit the information. The purpose of the radio is to transmit data from the lateral rail measurement device 100 to any remote locations as required.

The lateral rail measurement device 100 and specifically, the control box 110 may also include a microprocessor as well as data storage capabilities. The microprocessor may be programmed to include data logging features as well and to record and log any and all data from the lateral rail measurement device 100. The data logged may then be uploaded to be analyzed and reviewed as needed and required.

An embodiment for transmitting and receiving the data collected by the lateral rail measurement device 100 described above is provided in FIG. 3. It should be noted that the term "remote" as used herein means any location that is not at the lateral rail measurement device 100. Such a location may be next to the lateral rail measurement device 100, such as in a rail yard, or a location that is cross country with respect to the location of the lateral rail measurement device 100.

Figure 3:
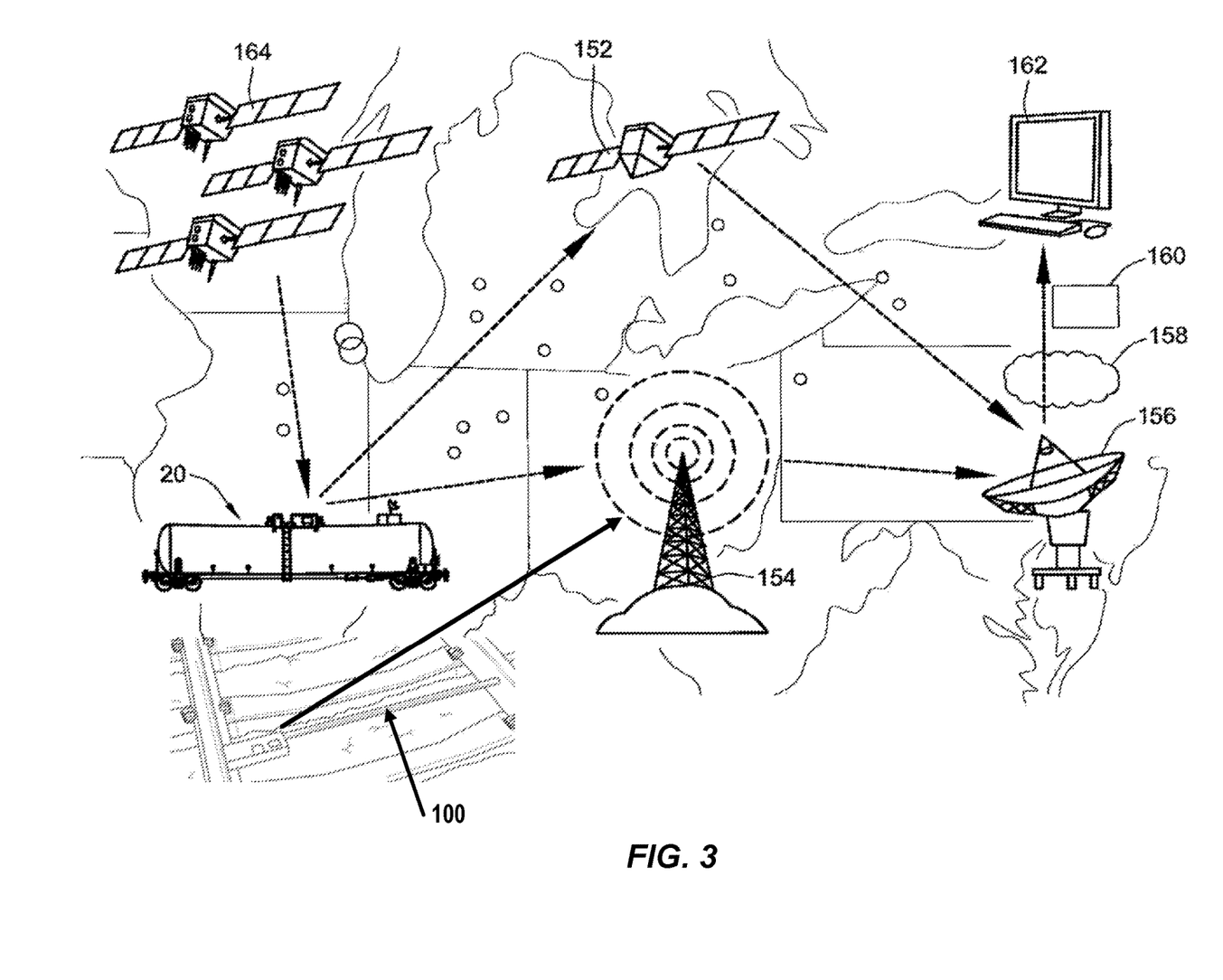
FIG. 3 is a flow diagram illustrating the data transmission and reception components in accordance with an embodiment of the device of the present invention.

As illustrated in FIG. 3, the data from the lateral rail measurement device 100 may be transmitted to various devices and systems without departing from this invention. In one embodiment, the data from the lateral rail measurement device 100 may be transmitted via Bluetooth to a smart device. Additionally, the data from the lateral rail measurement device 100 may be transmitted to a geo-stationary communications satellite 152 and/or a cellular system 154 to one or more remote receiving station(s) 156. The receiving station 156 transmits the data via the Internet 158 to a web based portal 160 which is accessible by a user via a workstation 162. Data collected and transmitted can be from any lateral rail measurement device 100. Location data may be generated by Global Positioning System (GPS) satellite technology 164. As was described above, the lateral rail measurement device 100 may feature a number of additional data collection outputs, such as angle differential, real-time rail displacement between the first rail 12 and the second rail 14, minimum and maximum displacement between the first rail 12 and the second rail 14, speed of the train, and direction of the train. Outputs from all of the data from the lateral rail measurement device 100 may be combined together to electronically represent the status or condition.

The lateral rail measurement device 100 may include a receiver/CPU and a GPS transponder which interacts with the U.S. Federal location satellites. This feature gives location, altitude, speed and other features offered by conventional GPS capabilities. The GPS and sensor data is then transmitted via a modem in the specified form of transmission along with the remaining rail displacement data. Once the data is received by the end user, the data can be further combined for additional value. A preferred method to add value to data generated by the system is by associating the location data (GPS) with information stored in the on-board memory of microprocessors in the lateral rail measurement device 100.

Once data is received by the end user (such as receiving station 156 or portal 160 in FIG. 3), it is loaded into a website or computer based software program capable of sorting, running calculations, manipulating and displaying data in formats that benefit the end user. The software may include a website which can display and run calculations to provide the needed information for the end user.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

We claim:

1. A lateral rail measurement device to measure a distance between two rails when a train is passing over the device, the device comprising:
   a control box comprising:
      a first side configured to mount to an inner side of a first rail;

a second side that is opposite the first side; and
a controller; and
a measurement arm configured to extend from the second side of the control box to an inner side of a second rail opposite the first rail,
wherein, while a train is operating over the first rail and the second rail, the controller is connected to the measurement arm and the controller is configured to measure:
a real-time rail displacement between the first rail and the second rail,
a maximum displacement between the first rail and the second rail, and
a minimum displacement between the first rail and the second rail.

2. The device of claim 1, wherein the control box includes one or more sensors configured to detect an approaching train and automatically turn on the lateral rail measurement device when the approaching train is within a range.

3. The device of claim 1, wherein:
the controller is configured to:
measure and record a separation distance between the first rail and the second rail; and
initiate transmission of a signal based on the separation distance being greater than a predetermined distance that could derail the train.

4. The device of claim 1, wherein the controller is configured to measure and record an angle between the first rail and the second rail and determine an angle differential of the first rail and the second rail.

5. The device of claim 1, wherein the control box includes a display configured to display a train speed, a train direction, the real-time rail displacement, the maximum displacement between the first rail and the second rail, the minimum displacement between the first rail and the second rail, or a combination thereof.

6. The device of claim 5, wherein:
while the control box is mounted to the first rail, the measurement arm is configured to moveable from a first position in which the measurement arm does not contact the second rail to a second position in which the measurement arm contacts the second rail; and
the control box comprises a spring configured to actuate the measurement arm between the first and second position.

7. The device of claim 5, wherein the display comprises an LCD display.

8. The device of claim 1, wherein the controller includes data storage configured to be programmed to record and log data from the lateral rail measurement device.

9. The device of claim 8, wherein the data from the lateral rail measurement device is configured to be wirelessly transmitted from the control box to a second device.

10. The device of claim 1, wherein the control box and the measurement arm include a pivoting mount, wherein the pivoting mount of the control box is configured to attach to a web of the first rail and the pivoting mount of the measurement arm is configured to attach to a web of the second rail.

11. The device of claim 1, wherein the control box includes magnets coupled to the first side of the control box and configured to magnetically attach the control box to the inner side of the first rail.

12. A lateral rail measurement device to measure a distance between two rails when a train is passing over the device, the device comprising:
a control box configured to mount to a first rail, the control box comprising:
a microprocessor that includes data storage configured to record and log data from the lateral rail measurement device, and
a display configured to display a train speed, a train direction, a real-time rail displacement between the first rail and a second rail opposite the first rail, a maximum displacement between the first rail and the second rail, a minimum displacement between the first rail and the second rail, or combination thereof; and
a measurement arm that extends from the control box to the second rail,
wherein the microprocessor is connected to the measurement arm and, while a train is operating over the first rail and the second rail, the microprocessor is configured to measure:
the real-time rail displacement between the first rail and the second rail,
the maximum displacement between the first rail and the second rail, and
the minimum displacement between the first rail and the second rail,
wherein the measurement arm is spring-loaded within the control box and the measurement arm is configured to extend to the second rail.

13. The device of claim 12, wherein the control box includes one or more sensors configured to detect an approaching train and automatically turn on the lateral rail measurement device when the approaching train is in range.

14. The device of claim 12, wherein the lateral rail measurement device is configured to measure and record an angle between the first rail and the second rail to determine an angle differential.

15. The device of claim 12, wherein the lateral rail measurement device weighs less than 10 pounds.

16. The device of claim 12, wherein the control box is configured to wirelessly transmit data to a second device.

17. The device of claim 12, wherein the control box and the measurement arm include a pivoting mount, wherein the pivoting mount of the control box configured to attach to a web of the first rail and the pivoting mount of the measurement arm configured to attach to a web of the second rail.

18. The device of claim 12, wherein the control box includes magnets configured to magnetically attach the control box to the first rail.

19. An apparatus comprising:
a rail measurement device configured to be positioned between a first rail and a second rail such that a first end of the rail measurement device is coupled to the first rail and a second end of the rail measurement device is coupled to the second rail;
wherein the rail measurement device is further configured to:
determine a minimum displacement between the first rail and the second rail while a train is in operation on the first and second rails; and
provide an indication of the minimum displacement.

20. The apparatus of claim 19, wherein:
the rail measurement device comprises:
a control box comprising a processor, the processor configured to determine the minimum displacement, provide the indication, or both; and
a measurement arm coupled to and extends from the control box;

the processor determines the minimum displacement based on movement of the measurement arm; and
the second end of the rail measurement device corresponds to an end of the measurement arm.

21. The apparatus of claim 20, wherein:
the first end of the rail measurement device is in contact with a first web of the first rail, the first web facing the second rail;
the second end of the rail measurement device is in contact with a second web of the second rail, the second web facing the first rail; or
a combination thereof.

22. The apparatus of claim 21, wherein the rail measurement device comprises:
a first mount at the first end of the rail measurement device and configured to attach to the first web;
a second mount at the second end of the rail measurement device and configured to attach to the second web; or
a combination thereof.

23. The apparatus of claim 21, wherein:
the first end of the rail measurement device in contact with the first web corresponds to a first end of the control box;
the second end of the measurement device in contact with the second web corresponds to and end of the measurement arm; and
the rail measurement device is further configured to determine an angle differential between the first rail and the second rail.

24. The apparatus of claim 20, wherein:
the rail measurement device is configured to determine the minimum displacement between the first rail and the second rail while the train is in operation over the rail measurement device and independent of a speed of the train; and
the rail measurement device further comprises:
a display configured to present the indication of the minimum displacement;
a storage device configured to store the indication of the minimum displacement;
a communication device configured to transmit the indication of the minimum displacement;
or a combination thereof; and
the control box comprises one or more panels configured to define a housing of the control box.

25. The apparatus of claim 20, wherein:
the rail measurement device further includes:
a GPS device configured to determine location information associated with the rail measurement device; and
one or more magnets configured to attach the rail measurement device to the first rail, the second rail, or both;
the measurement arm is spring-loaded within the control box; and
the rail measurement device is configured to transmit the indication of the minimum displacement and the location information according to a transmission format.

26. The apparatus of claim 19, wherein:
the rail measurement device is further configured to:
detect a train that is approaching;
detect a speed of the train while the train is in operation on the first and second rails;
determine a direction of the train;
while the train is in operation on the first and second rails and independent of the speed of the train:
determine a real-time rail displacement between the first rail and the second rail;
determine a maximum displacement between the first rail and the second rail;
determine a minimum displacement between the first rail and the second rail;
determine an angle differential between the first rail and the second rail; or
a combination thereof; and
determine a location of the rail measurement device.

27. A method comprising:
at rail measurement device positioned between a first rail and a second rail such that a first end of the rail measurement device is coupled to the first rail and a second end of the rail measurement device is coupled to the second rail, performing one or more operations comprising:
determining a minimum displacement between the first rail and the second rail while a train is in operation over the rail measurement device and independent of a speed of the train.

28. The method of claim 27, further comprising:
coupling a first end of the rail measurement device with a first web of the first rail, the first web facing the second rail;
coupling a second end of the rail measurement device with a second web of the second rail, the second web facing the first rail;
determining a location corresponding to the rail measurement device; and
associating the location with the minimum displacement.

29. The method of claim 27, further comprising:
while the train is in operation over the rail measurement device and independent of a speed of the train:
determining a real-time rail displacement between the first rail and a second rail opposite the first rail; and
determining a maximum displacement between the first rail and the second rail; and
storing data, at a data storage device of the rail measurement device, indicating the minimum displacement, the real-time rail displacement, and the maximum displacement.

30. The method of claim 27, further comprising:
detecting that the train is approaching;
turning on the rail measurement device;
determining an angle differential between the first rail and the second rail;
determining a speed of the train; and
providing an indication of the minimum displacement to a storage device of the rail measurement device, a display of the rail measurement device, a communication device of the rail measurement device, or a combination thereof.

31. An apparatus comprising:
a rail measurement device configured to be positioned between a first rail and a second rail such that a first end of the rail measurement device is coupled to the first rail and a second end of the rail measurement device is coupled to the second rail;
wherein the rail measurement device further configured to:
determine a minimum displacement between the first rail and the second rail;
determine a maximum displacement between the first rail and the second rail; and
provide an indication of the minimum displacement and the maximum displacement.

32. The apparatus of claim 31, wherein the maximum displacement and the minimum displacement are different values.

33. The apparatus of claim 31, wherein the rail measurement device is configured to determine the minimum displacement between the first rail and the second rail while a train is in operation on the first and second rails.

34. The apparatus of claim 31, wherein the minimum displacement is a non-zero value.

35. The apparatus of claim 31, wherein the rail measurement device is configured to:
   determine a first displacement of the first and second rails;
   determine a second displacement of the first and second rails that is less than the first displacement; and
   indicate the second displacement as the minimum displacement.

36. The apparatus of claim 35, wherein the rail measurement device is configured to:
   determine a third displacement between the rails that is greater than the first displacement; and
   indicate the third displacement as the maximum displacement.

37. The apparatus of claim 31, wherein the rail measurement device is configured to determine a real-time rail displacement between the first rail and the second rail and provide an indication of the real-time rail displacement.

* * * * *